June 26, 1956
F. J. HONN
2,752,332
COPOLYMERS OF A PERFLUOROCHLOROETHYLENE
AND A FLUOROETHYLENE AND METHOD
FOR THEIR PREPARATION
Filed Jan. 21, 1953
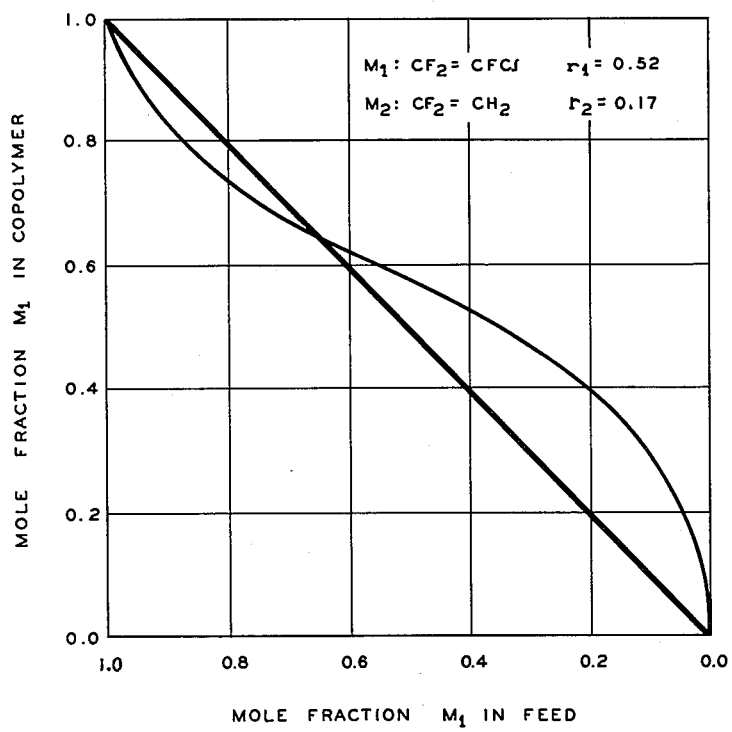
*INVENTOR*
FRANCIS J. HONN
BY
ATTORNEYS United States Patent Office 2,752,332
Patented June 26, 1956

2,752,332

COPOLYMERS OF A PERFLUOROCHLOROETHYLENE AND A FLUOROETHYLENE AND METHOD FOR THEIR PREPARATION

Francis J. Honn, Bloomfield, N. J., assignor to The M. W. Kellogg Company, Jersey City, N. J., a corporation of Delaware Application January 21, 1953, Serial No. 332,186

15 Claims. (Cl. 260—87.7)

This invention relates to halogen-containing polymeric materials. In one aspect, the invention relates to halogen-containing copolymers. More particularly in this aspect, the invention relates to copolymers of a perfluorochloroethylene and a fluoroethylene and the method for their preparation.

As an accumulative group, halogen-containing polymers offer wide utility in various industrial applications, serving not only as substitutes for natural rubbers, but in some instances the various individual synthetics are superior to the natural products, e. g., in oil-resistance and aging characteristics. In this respect, polymers containing fluorine have been found to be both relatively inert and to possess good physical and chemical stability. One of the most useful polymers in this field is the perfluorochloroethylene polymer of trifluorochloroethylene. This particular polymer of trifluorochloroethylene has now been developed to a stage in which it is commercially available and has many useful applications by reason of its chemical inertness, and high physical strength and resilience, when in the form of a plastic. Four-fifths of the weight of polytrifluorochloroethylene is made up of fluorine and chlorine. The plastic form of polytrifluorochloroethylene is colorless and transparent, and has a high chemical stability with no effect being observed on the polymer after prolonged exposure to hydrofluoric acid, hydrochloric acid, and strong caustic solutions, as well as fuming nitric acid, aqua regia and other vigorous oxidizing materials. The plastic form of this polymer exhibits flexibility and resilience, is not affected by water, or by humidity, and, in general, is an efficient insulating material.

With particular reference to the utility of perfluorochloroethylene polymers, such as trifluorochloroethylene in particular, it has been found desirable to employ these polymers in the form of relatively hard protective coatings or films on surfaces which are fairly rigid or on surfaces in which flexibility is not a prime requisite, and under conditions in which these surfaces may come into contact with any of the aforementioned oxidizing materials, oils, fuels, and other powerful reagents, under varying temperature conditions. Since the plastic polymers of perfluorochloroethylenes, particularly plastic polymers of trifluorochloroethylene, are of high molecular weight, these polymers are difficult to melt and apply in the liquid state. These polymers have heretofore been applied to various surfaces in the form of dispersions in suitable diluents or carriers. It has been found, however, that with such dispersions, e. g., dispersions of polytrifluorochloroethylene, relatively long periods of time are required to permit the dispersed particles to flow and form a continuous protective coating or film on the surface to be protected, by reason of the slow rate of flow of the homo polymer. Furthermore, it has been found that in applying such dispersions to the surface to be coated, relatively high temperatures, usually in excess of 250° C., must be employed in order to evaporate the diluent or carrier and fuse the particles of the homo polymer plastic to form a continuous coating or film. When such temperatures are employed, in many instances these temperatures tend to destroy the metal or fabric surface sought to be coated. This is particularly apparent where the metallic surface comprises materials employed in the manufacture of aircraft component parts, or protective suitings or other articles of clothing, in which lack of rigidly or drape is not a prime requisite. If one attempts to dissolve the aforementioned homo polymer in various reagents, in which the homo polymer is soluble (rather than in dispersants or carriers), it is found that the homo polymer is not soluble at room temperature in any known solvent. The production of a perfluorochloroethylene, such as polytrifluorochloroethylene, in a form in which it is readily soluble in various solvents at room temperature, to produce relatively hard surface coatings and films, and which are easily vulcanized, is much desired.

It is, therefore, an object of this invention to provide new polymers suitable as coatings or films having desirable physical and chemical characteristics, exhibiting the properties of corrosion-resistance to oils, fuels, and various powerful reagents, and at the same time possess relatively high hardness, flexibility at relatively low temperatures, and which are also soluble in various solvents and other vehicles at room temperature, and are also easily vulcanized.

Another object of this invention is to provide a method for the manufacture of such polymers having the aforementioned characteristics.

Various other objects and advantages of the present invention will become apparent to those skilled in the art from the accompanying disclosure and description.

The polymers of the present invention are resinous copolymers of a perfluorochloroethylene, such as trifluorochloroethylene, and a fluoroethylene, such as vinylidene fluoride, and are of special value as durable coatings or films for metal surfaces or fabrics, in which rubberiness or flexibility are not a prime requisite. The copolymers of the present invention contain the perfluorochloroethylene in an amount which is more than 69 mole per cent and not higher than 80 mole per cent, and the remaining major constituent is the fluoroethylene. In general, as more fully hereinafter described, these copolymers are prepared by copolymerizing a perfluorochloroethylene (e. g., trifluorochloroethylene) with the fluoroethylene (e. g., vinylidene fluoride) at temperatures between about —25° C. and about 50° C. in the presence of a polymerization catalyst, either as an inorganic promoter in the form of a water-suspension type recipe or as an organic peroxide promoter in mass or bulk type polymerization. The copolymerization of the aforementioned monomers produces resinous, moldable, relatively hard copolymers. These copolymers are flexible, even at temperatures as low as —65° F., retain superior strength and hardness, and do not become embrittled after aging even at temperatures as high as about 550° F. These copolymers are chemically and thermally stable, oil and fuel-resistant, are not attacked by strong oxidizing materials and reagents, are soluble in various solvents and vehicles at room temperature for application to various surfaces, are vulcanizable, and are particularly suited as durable relatively hard coatings for application to metallic and other rigid surfaces, and flexible materials, in which lack of rigidity and/or drape are not prime requisites.

As indicated above, the polymers of the present invention are resinous copolymers of a perfluorochloroethylene, such as trifluorochloroethylene ($CF_2=CFCl$), and a fluoroethylene, such as vinylidene fluoride ($CF_2=CH_2$).

In carrying out the polymerization reaction between the perfluorochloroethylene and the fluoroethylene monomers to produce the copolymers of the present invention, it has been indicated that the finished copolymers contain the perfluorochloroethylene in an amount which is more than 69 mole per cent (i. e., above 69 mole per cent but not more than 70 per cent as a lower limit) and not higher than about 80 mole per cent, with the remaining major constituent being the fluoroethylene. If the finished copolymer contains less than the aforementioned lower limit of slightly more than 69 mole per cent of the perfluorochloroethylene monomer, the copolymer tends to exhibit properties of being less chemically inert to the aforementioned oxidizing agents and other powerful reagents, due to the high increase in fluoroethylene content. If on the other hand, the finished copolymer contains more than about 80 mole per cent of the perfluorochloroethylene monomer, the copolymer is hard to get into solution, in various solvents, and, therefore, loses its desirability as an easily-applied surface coating or film. Within this critical range, it is preferred that the finished copolymers contain the perfluorochloroethylene monomer in an amount which is higher than 69 mole per cent and up to about 75 mole per cent, with the fluoroethylene monomer constituting the remaining major constituent.

To attain all the advantages inherent in each of the aforementioned copolymer systems, the copolymers of any desired compositions should be as uniform as possible, that is each polymeric molecule should contain essentially the same proportion of the perfluorochloroethylene monomer to the fluoroethylene monomer, as every other polymeric molecule in the batch. In other words, the molar ratio in a polymeric molecule should correspond as closely as possible to the other molecules in the same batch. If the respective copolymers are heterogeneous, the aforementioned desired physical and chemical properties may tend to be distorted.

The polymerization reaction is carried out, as indicated above, at a temperature between about $-25°$ C. and about $50°$ C. When the polymerization promoter is in the form of a water-suspension type recipe, the reaction is preferably carried out at a temperature between about $0°$ C. and about $35°$ C. When the polymerization promoter is an organic peroxide promoter in a mass polymerization system, the reaction is preferably carried out at a temperature between about $-20°$ C. and about $0°$ C. Of the water-suspension recipe type catalysts, a redox catalyst system is preferred (having no emulsifier), and contains an oxidant, a reductant and a variable valence metal salt. The oxidant in the water-suspension type recipe is preferably an inorganic persulfate, such as potassium persulfate, sodium persulfate or ammonium persulfate. The reductant is preferably a bisulfite such as sodium bisulfite or potassium bisulfite. The variable valence metal salt, which is employed for the purpose of regenerating the oxidant, is preferably in the form of an iron salt such as ferrous sulfate or ferrous nitrate, with ferrous sulfate being the most desirable variable valence metal salt. Of the organic peroxide promoters halogen substituted acetyl peroxides are employed in carrying out the copolymerization in the absence of a suspension agent. Trichloroacetyl peroxide is a preferred promoter of this type. Other halogen substituted organic peroxides suitable for carrying out the copolymerization are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

In carrying out the above-mentioned polymerization procedure, the monomer reactivity ratios for the perfluorochloroethylene and the fluoroethylene, are calculated in accordance with the Mayo, Lewis and Walling equation. This equation is represented as follows:

$$-\frac{d[M_1]}{d[M_2]} = \frac{[M_1]}{[M_2]} \frac{r_1[M_1]+[M_2]}{[M_1]+r_2[M_2]} *$$

* Reference: "Copolymerization," F. R. Mayo and Cheves Walling, Chemical Reviews, vol. 46, pages 195–197.

wherein $r_1$ and $r_2$ are parameters, $M_1$ and $M_2$ are concentrations in moles of monomer 1 and monomer 2. The equation describes the composition of the copolymer being formed at any instant, $$\frac{d[M_1]}{d[M_2]}$$

from a polymerization mixture of two monomers at concentrations $M_1$ and $M_2$ by means of two parameters, $r_1$ and $r_2$. These parameters (i. e., the monomer reactivity ratios), each represent the ratio of two rate constants for the reaction of a chain with a given monomer unit on the growing end with its own type of monomer, and with the other type of monomer.

For producing a copolymer of trifluorochloroethylene and vinylidene fluoride, as a representative copolymer of the present invention, monomer reactivity ratios calculated in accordance with the Mayo, Lewis and Walling equation, are $r_1 = 0.52 \pm 0.12$, where $M_1$ is trifluorochloroethylene, and $r_2 = 0.17 \pm 0.02$, where $M_2$ is vinylidene fluoride. These values indicate that each monomer prefers to add to the other monomer rather than to itself during polymerization, and results in a strong tendency towards alternation in this system. These values also indicate that there is an azeotropic feed ratio at which the copolymer and monomer composition remain identical over the entire conversion scale.

An instantaneous copolymer feed-composition diagram, derived from the above values, is shown in the accompanying drawing. By reference to the curved line of the drawing, the proper feed may be selected for the instantaneous preparation of the copolymer, of desired composition, which has more than 69 mole per cent and not more than 80 mole per cent of trifluorochloroethylene, and the remaining major constituent being vinylidene fluoride.

According to this diagram, a 65/35 molar ratio of trifluorochloroethylene/vinylidene fluoride copolymer, is azeotropic, as shown by the straight line of the drawing, that is, the composition of the copolymer remains constant and equal to that of the feed over the entire range of up to approximately 100 per cent conversion. If an attempt is made to prepare a particular copolymer ratio (other than the azeotropic molar ratio), by feeding a single charge of constant composition (i. e., one which has been calculated to yield instantaneously a copolymer of desired composition), the less reactive monomer will lag in the reaction. As the copolymerization proceeds, the copolymer becomes excessively rich in the more reactive monomer and assumes, to a greater degree, the properties characteristic of the more reactive monomer. As the relative concentration of the less reactive monomer to the more reactive monomer increases, the less reactive monomer is drawn more and more into the reaction. The copolymer produced becomes rich in respect to that monomer and eventually a homo polymer of the less reactive monomer will be obtained when the more reactive monomer is exhausted. This unevenness of reaction leads to an excessive spread in molar ratios found in the resulting copolymers.

In view of the inequality of reactivity, the charging of the monomers to the reactor, either in increments or as a continuous charge, should be carried out in such manner that the resulting copolymer composition varies by not more than $\pm 2$ mole per cent from chain to chain.

It has been found that the perfluorochloroethylene/fluoroethylene copolymers, e. g., copolymers of trifluorochloroethylene and vinylidene fluoride, which have an initial molar ratio of 75/25, vary to such an extent that at a conversion between about 70 and 80 per cent, the vinylidene fluoride will be exhausted from the feed, and that any polymers produced thereafter will comprise pure polytrifluorochloroethylene. If the copolymer produced is to be made sufficiently homogeneous, the monomers must be added incrementally or continuously so that the monomer composition is maintained at a constant level or the conversion is restricted to about 50 per cent, where the copolymer does not vary by more than ±2 mole per cent from the average. To produce a copolymer of desired molar ratio through increment feeding, it is necessary to determine the molar ratio required for the initial monomer charge, which will, at the instant polymerization begins, yield a copolymer of desired molar ratio. As the concentration of the less reactive monomer increases, increment charges of composition designed to restore or maintain the molar ratio of the monomer phase at or near the initial molar level, are added. The number of increment feedings will be governed by the molar spread which may be tolerated. When the increment charges become so numerous as to be continuous, a charge of constant composition (the composition being equal to the molar ratio of the copolymer being formed) may be pumped into the polymerization reactor at a rate equal to the rate of polymerization. The variations involved in continuous feeding will be limited to the errors imposed by the pumping apparatus itself.

In general, the feed composition will comprise between about 75 mole per cent and about 90 mole per cent of the perfluorochloroethylene and the remainder of the copolymer feed being made up of the fluoroethylene to produce a copolymer having more than 69 and not more than 80 mole per cent of the perfluorochloroethylene. To produce a copolymer within the preferred range in which the perfluorochloroethylene is present in an amount which is higher than 69 and not more than about 75 mole per cent, the feed composition will comprise between about 75 mole per cent and about 85 mole per cent of the perfluoroethylene.

The aforementioned copolymerization reaction between the perfluorochloroethylene and the fluoroethylene monomers to produce the copolymers of the present invention, is carried out at pressures between about 85 and about 250 pounds per square inch.

As previously indicated, the copolymers of the present invention are particularly suited and useful as durable, flexible coatings for application to metal or fabric surfaces in which lack of rigidity or drape is not a prime requisite. Particularly useful solvents comprise the aliphatic and aromatic esters, the ether alcohols, and ketones. Typical examples of these solvents are diisobutyl ketone, methyl ethyl ketone, methyl isobutyl ketone, cyclohexanone, methoxy ethanol, ethoxy ethanol, ethoxy ethoxy ethanol, methyl acetate, butyl acetate and ethyl benzoate. In this respect, it should be noted that it is often desirable to reduce the molecular weight of the finished copolymer of the present invention, in order to obtain greater solubility in organic solvents, such as those indicated above. This is of importance in order to vary the softness of the polymer for easier processability. The polymerization reactions which are carried out in the presence of the polymerization type catalysts of the present invention normally tend to form very high molecular weight copolymeric products. Reduction of the strength of the recipe of the polymerization catalyst merely slows the rate of reaction without affecting, appreciably the molecular weight of the finished copolymer. It has been found, however, that the addition of various polymerization modifiers appreciably reduces the molecular weight of the copolymer products, and increases their solubility and ease of processability without affecting, unduly, the overall yield. Suitable polymerization modifiers include chloroform ($CHCl_3$), Freon 113 ($CF_2ClCFCl_2$), carbon tetrachloride ($CCl_4$), trichloroacetyl chloride ($CCl_3COCl$), dodecyl mercaptan ($C_{12}H_{25}SH$), and bromotrichloromethane [($CBrCl_3$)]. These modifiers are preferably added in amounts between about 1 to 10 parts, by weight, per 100 parts of total perfluorochloroethylene and fluoroethylene monomers charged to the polymerization reaction. Of these modifiers dodecyl mercaptan is preferred. This particular modifier appears to be much more powerful in function, than any of the others disclosed above and is, therefore, preferably employed in quantities ranging from 0.01 to 0.3 part per 100 parts of total monomer charged to the polymerization reaction.

The following examples are offered for a better understanding of the present invention and are not to be construed as limiting its scope.

EXAMPLE I

This example is intended to illustrate the preparation of a copolymer of trifluorochloroethylene and vinylidene fluoride.

The following water-suspension type recipe was employed in carrying out the polymerization reaction:

| | Parts by weight |
|---|---|
| Water, distilled | 200 |
| $CF_2=CFCl$ | [1] 92.2 |
| $CF_2=CH_2$ | [1] 7.8 |
| $(NH_4)_2S_2O_8$ | 2.0 |
| $Na_2S_2O_5$ | 0.8 |
| $FeSO_4 \cdot 7H_2O$ | 0.2 |

[1] 86/14 molar.

Catalyst and activator solution was prepared by dissolving 2 parts of $(NH_4)_2S_2O_8$ in 20 parts of water. Next, 0.8 part of $Na_2S_2O_5$ were dissolved in another 20 parts of water. In still another 20 parts of water, 0.2 part of $FeSO_4 \cdot 7H_2O$ was dissolved.

140 parts of water were next charged to a silver-lined steel bomb. The aforementioned $(NH_4)_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C. over a period of 18 hours.

The residual monomer was then vented from the bomb and a mixture of water and particles of resinous polymer were discharged. These particles were washed with hot water to remove residual salts, and were then dried in vacuo at room temperature.

The mole per cent of $CF_2=CFCl$, combined in the resulting copolymeric product was 75 per cent and the conversion was 27 per cent.

EXAMPLE II

The procedure, illustrated by Example I, was repeated except that the following water-suspension type recipe was employed in the preparation of the trifluorochloroethylene/vinylidene fluoride copolymer:

| | Parts by weight |
|---|---|
| Water, distilled | 200 |
| $CF_2=CFCl$ | [1] 94.2 |
| $CF_2=CH_2$ | [1] 5.8 |
| $(NH_4)_2S_2O_8$ | 3.0 |
| $Na_2S_2O_5$ | 1.2 |
| $FeSO_4 \cdot 7H_2O$ | 0.3 |

[1] 90/10 molar.

The mole per cent of $CF_2=CFCl$ combined in the resulting copolymeric product was 76 per cent and the conversion was 14 per cent.

EXAMPLE III

The procedure, illustrated by Example I, was repeated except that the following water-suspension type recipe was employed in the preparation of the trifluorochloroethylene/vinylidene fluoride copolymers:

| | Parts by weight |
|---|---|
| Water, distilled | 200 |
| $CF_2=CFCl$ | [1] 92.4 |
| $CF_2=CH_2$ | [1] 7.6 |
| $(NH_4)_2S_2O_8$ | 2.0 |
| $Na_2S_2O_5$ | 0.8 |
| $FeSO_4 \cdot 7H_2O$ | 0.2 |

[1] 87/13 molar.

The mole per cent of $CF_2=CFCl$ combined in the resulting copolymeric product was 74 per cent and the conversion was 20 per cent.

EXAMPLE IV

The procedure, illustrated by Example I, was repeated except that the following water-suspension type recipe was employed in the preparation of the trifluorochloroethylene/vinylidene fluoride copolymer:

| | Parts by weight |
|---|---|
| Water, distilled | 200 |
| $CF_2=CFCl$ | [1] 92.4 |
| $CF_2=CH_2$ | [1] 7.6 |
| $(NH_4)_2S_2O_8$ | 1.5 |
| $Na_2S_2O_5$ | 0.6 |
| $FeSO_4.7H_2O$ | 0.15 |

[1] 87/13 molar.

The mole per cent of $CF_2=CFCl$ combined in the resulting copolymeric product was 76 per cent and the conversion was 20 per cent.

EXAMPLE V

The procedure, illustrated by Example I, was repeated except that the following water-suspension type recipe was employed in the preparation of the trifluorochloroethylene/vinylidene fluoride copolymer:

| | Parts by weight |
|---|---|
| Water, distilled | 200 |
| $CF_2=CFCl$ | [1] 87.8 |
| $CF_2=CH_2$ | [1] 12.2 |
| $(NH_4)_2S_2O_8$ | 1.5 |
| $Na_2S_2O_5$ | 0.6 |
| $FeSO_4.7H_2O$ | 0.15 |

[1] 80/20 molar.

The mole per cent of $CF_2=CFCl$ was 76 per cent and the conversion was 54 per cent.

EXAMPLE VI

This example is intended to illustrate the preparation of a copolymer of trifluorochloroethylene and vinylidene fluoride, employing an organic peroxide promoter, viz., trichloroacetyl peroxide, in a mass polymerization system to produce a resinous copolymer.

The polymerization was carried out in a glass tube containing a feed comprising about 85 mole per cent trifluorochloroethylene and about 15 mole per cent vinylidene fluoride, in the presence of trichloroacetyl peroxide as the promoter. Trichloroacetyl peroxide was employed in an amount of 0.037 part per 100 parts of total monomers charged. The tube was placed in a bath maintained at a temperature of approximately $-15°$ C. for a period of about five days. At the end of that time, the tube was removed from the bath. The remaining unreacted monomers were vented from the tube. The solid copolymer was recovered and dried in an oven at about 120° C. The mole per cent of trifluorochloroethylene combined in the copolymer was found to be about 77.5 per cent with a 25 per cent conversion of the total monomers charged. It was found that a resinous, colorless material had been produced.

EXAMPLE VII

The procedure, illustrated by Example VI, was repeated, employing trichloroacetyl peroxide in the amount previously indicated, as an organic peroxide promoter, in a mass polymerization system, to produce a resinous copolymer.

The polymerization was carried out in a glass tube containing a feed comprising about 75 mole per cent trifluorochloroethylene and about 25 mole per cent vinylidene fluoride. The tube was placed in a bath maintained at a temperature of approximately $-15°$ C. for a period of about four days. At the end of that time, the tube was removed from the bath. The remaining unreacted monomers were vented from the tube. The solid copolymer was recovered and dried in an oven at about 120° C. The mole per cent of trifluorochloroethylene combined in the copolymer was found to be about 70.5 per cent with a 32 per cent conversion of the total monomers charged. It was found that a resinous, colorless material had been produced.

As previously indicated, the water-suspension recipe type catalysts, employed in carrying out the polymerization reaction to produce the improved copolymers of the present invention contain an oxidant, in the form of a persulfate, or other peroxy compounds, of this type; a reductant, which is preferably a bisulfite, and a variable valence metal salt, which is preferably in the form of an iron salt. In this respect, it should be noted that the presence of the reductant and variable valence metal salt makes possible an increase in the quantity of free radicals which facilitates the ease of polymerization. However, it is also within the scope of this invention to carry out the polymerization reaction with the aforementioned water-suspension type recipe, in which the recipe contains only an oxidant (e. g., one of the aforementioned peroxy compounds), and eliminate the presence of either the reductant or variable valence metal salt, or both.

As previously indicated, the resinous copolymers of the present invention prepared by copolymerizing a perfluorochloroethylene with a fluoroethylene within the critical molar ratios and under the polymerization conditions previously described, possess unusual and highly desirable chemical and physical properties which make them particularly suited as durable, relatively hard coatings for application to various metallic and other rigid surfaces. These copolymers may be used, in a preferred form, as coatings for metallic surfaces employed in the manufacture of aircraft component parts, such as aluminum surfaces of tanks and other components exposed to strong reagents. They may also take the form of protective suitings, protective envelopes, and other articles of manufacture which are comprised of exposed surfaces which may be subjected to abrasion or other forms of impact in the course of performing their function under special environmental conditions. Particular applicability of the copolymers of the present invention is to be found when they are employed as protective coatings on surfaces, such as stated above, which are to be subjected to environmental conditions in which they may come into contact with corrosive substances, such as, oils, fuels and various powerful reagents, as previously described, and over a wide temperature range. These copolymeric coatings are found to have high tensile strength, good resinous properties, high heat-resistance, and ease of solubility in various solvents, when in their raw copolymeric state for application to various surfaces. Of special importance is their quality of relatively high hardness. These advantages are only obtainable by forming the copolymers, under the polymerization conditions previously described, and within the molar ratios previously defined (viz., with a content of the perfluorochloroethylene in an amount which is higher than 69 mole and not higher than about 80 mole per cent, and the remaining major constituent being the fluoroethylene).

When employed as protective coatings, for any of the surfaces described above, the raw copolymer is dissolved in a suitable solvent, such as those described above, to obtain an adherent coating. Particularly useful solvents for this purpose may comprise aliphatic and aromatic esters, either alcohols and ketones. The raw polymer, which may also include fillers if so desired, is dissolved in the solvent, preferably to an extent in which the total quantity of solids represents 20 per cent by weight of the entire coating composition. The coating is now applied to the fabric, employing such apparatus as is commonly used for spraying, dipping, and brushing. The solvent, after the wet coating has been applied to the desired surfaces, is permitted to evaporate from the surface of any of the aforementioned materials (and may also be accomplished in the presence of elevated temperature). After the solvent has completely evaporated, the coated surface is now ready for use. It should also be noted, that the coating composition containing the aforementioned copolymer, may be applied to the surface either as a single coat, or if so desired, the protective coating may be built-up by the application of several layers of the coating composition, each layer being permitted to harden by solvent evaporation, before the next layer is applied. Furthermore, if so desired, the protective coating can be suitably pigmented, by adding various pigmenting agents to the coating mixture prior to application to the desired surface.

The following table represents the characteristics obtained for a typical copolymer of the present invention, in which various critical properties are listed for a copolymer of trifluorochloroethylene and vinylidene fluoride, in a 75/25 molar ratio.

*Properties of $CF_2=CFCl/CF_2=CH_2$ (75/25 molar) copolymer*

| | |
|---|---|
| Tensile strength, p. s. i. | 2000–4000. |
| Elongation | 75%. |
| Hardness, Shore A, 5 sec | 70–80. |
| Vol. Swell, SR-6 | 5%. |
| Vol. Swell, SR-10 | 1%. |
| Brittle point | Less than —65° F. |
| Heat resistance | To 500° F. |
| Nitric acid resistance (7 days at 125° F.) | Raw copolymer absorbs 1% nitric acid. |
| Susceptibility to attack by microorganisms. | None. |
| Effect of prolonged sunlight | None. |
| Effect of prolonged beta radiation. | None. |

The most probable theory for the superiority of the copolymers of the present invention, containing above 69 mole per cent and about 80 mole per cent of the perfluorochloroethylene (e. g., trifluorochloroethylene) and the remaining major constituent being the fluoroethylene (e. g., vinylidene fluoride) is the significance of the presence of at least one chlorine atom in the perfluorochloroethylene, attached to one or more carbon atoms, and at least one hydrogen atom in the fluoroethylene, attached to one or more of the carbon atoms. The chlorine atom in the perfluorochloroethylene is of importance in permitting copolymerization to take place easily between the perfluorochloroethylene and the fluoroethylene monomers. The hydrogen atom in the fluoroethylene is of importance in obtaining the aforementioned desirable characteristics of the copolymer. The fluorine atom attached to at least one of the carbon atoms in each of the perfluorochloroethylene and fluoroethylene monomers, is of importance in obtaining stability of the finished copolymer without effecting the stability of the respective comonomers, during the polymerization reaction.

Since certain changes may be made in carrying out the process of the present invention in producing the desired copolymers, without departing from the scope of the invention, it is intended that all matter contained in the above description is to be interpreted as illustrative and not in a limiting sense.

Having thus described my invention, I claim:

1. A copolymer of about 70 to about 80 mole per cent trifluorochloroethylene and correspondingly about 30 to about 20 mole per cent vinylidene fluoride as substantially the sole monomeric components.

2. A copolymer of about 70 to about 75 mole per cent trifluorochloroethylene and correspondingly about 30 to about 25 mole per cent vinylidene fluoride as substantially the sole monomeric components.

3. A resinous copolymer of about 75 mole per cent trifluorochloroethylene and about 25 mole per cent vinylidene fluoride as substantially the sole monomeric components.

4. A method for preparing a copolymer of about 70 to about 80 mole per cent trifluorochloroethylene and correspondingly about 30 to about 20 mole per cent vinylidene fluoride as substantially the sole monomeric components which comprises polymerizing a reaction mixture containing vinylidene fluoride and between about 75 mole per cent and about 90 mole per cent trifluorochloroethylene as substantially the sole monomeric components at a temperature between about —25° C. and about 50° C. in the presence of a polymerization promoter.

5. A method for preparing a copolymer of about 70 to about 75 mole per cent trifluorochloroethylene and correspondingly about 30 to about 25 mole per cent vinylidene fluoride as substantially the sole monomeric components which comprises polymerizing a reaction mixture containing vinylidene fluoride and between about 75 mole per cent and about 85 mole per cent trifluorochloroethylene as substantially the sole monomeric components at a temperature between about —25° C. and about 50° C. in the presence of a polymerization promoter.

6. A method for preparing a copolymer of about 70 to about 80 mole per cent trifluorochloroethylene and correspondingly about 30 to about 20 mole per cent vinylidene fluoride as substantially the sole monomeric components which comprises polymerizing a reaction mixture containing vinylidene fluoride and between about 75 mole per cent and about 90 mole per cent trifluorochloroethylene as substantially the sole monomeric components at a temperature between about 0° C. and about 35° C. in the presence of a polymerization promoter.

7. A method for preparing a copolymer of about 70 to about 80 mole per cent trifluorochloroethylene and correspondingly about 30 to about 20 mole per cent vinylidene fluoride as substantially the sole monomeric components which comprises polymerizing a reaction mixture containing vinylidene fluoride and between about 75 mole per cent and about 90 mole per cent trifluorochloroethylene as substantially the sole monomeric components at a temperature between about —20° C. and about 0° C. in the presence of a polymerization promoter.

8. A method for preparing a resinous copolymer of about 70 to about 80 mole per cent trifluorochloroethylene and correspondingly about 30 to about 20 mole per cent vinylidene fluoride as substantially the sole monomeric components which comprises polymerizing a reaction mixture containing vinylidene fluoride and between about 75 mole per cent and about 90 mole per cent trifluorochloroethylene as substantially the sole monomeric components at a temperature between about 0° C. and about 35° C. in the presence of a polymerization promoter comprising a peroxy compound.

9. A method for preparing a resinous copolymer of about 70 to about 80 mole per cent trifluorochloroethylene and correspondingly about 30 to about 20 mole per cent vinylidene fluoride as substantially the sole monomeric components which comprises polymerizing a reaction mixture containing vinylidene fluoride and between about 75 mole per cent and about 90 mole per cent trifluorochloroethylene as substantially the sole monomeric components at a temperature between about —25° C. and about 50° C. in the presence of a polymerization promoter comprising an organic peroxide compound.

10. A method for preparing a resinous copolymer of about 70 to about 75 mole per cent trifluorochloroethylene and correspondingly about 30 to about 25 mole per cent vinylidene fluoride as substantially the sole monomeric components which comprises polymerizing a reaction mixture containing vinylidene fluoride and between about 75 mole per cent and about 85 mole per cent trifluorochloroethylene as substantially the sole monomeric components at a temperature between about 0° C. and about 35° C. in the presence of a polymerization promoter comprising a peroxy compound.

11. A method for preparing a resinous copolymer of about 70 to about 75 mole per cent trifluorochloroethylene and correspondingly about 30 to about 25 mole per cent vinylidene fluoride as substantially the sole monomeric components which comprises polymerizing a reaction mixture containing vinylidene fluoride and between about 75 mole per cent and about 85 mole per cent trifluorochloroethylene as substantially the sole monomeric components at a temperature between about −20° C. and about 0° C. in the presence of a polymerization promoter comprising an organic peroxide compound.

12. A method for preparing a copolymer of about 70 to about 75 mole per cent trifluorochloroethylene and correspondingly about 30 to about 25 mole per cent vinylidene fluoride as substantially the sole monomeric components which comprises polymerizing a reaction mixture containing vinylidene fluoride and between about 75 mole per cent and about 85 mole per cent trifluorochloroethylene as substantially the sole monomeric components at a temperature between about −20° C. and about 0° C. in the presence of a polymerization promoter comprising a halogen-substituted acetyl peroxide.

13. An article of manufacture which comprises a solid surface coated with a copolymer of about 70 to about 80 mole per cent trifluorochloroethylene and correspondingly about 30 to about 20 mole per cent vinylidene fluoride as substantially the sole monomeric components.

14. An article of manufacture which comprises a solid surface coated with a copolymer of about 70 to about 75 mole per cent trifluorochloroethylene and correspondingly about 30 to about 25 mole per cent vinylidene fluoride as substantially the sole monomeric components.

15. An article of manufacture which comprises a solid surface coated with a resinous copolymer of about 75 mole per cent trifluorochloroethylene and about 25 mole per cent vinylidene fluoride as substantially the sole monomeric components.

References Cited in the file of this patent

UNITED STATES PATENTS

| | | |
|---|---|---|
| 2,456,255 | Coffmen | Dec. 14, 1948 |
| 2,513,312 | Hanford | July 4, 1950 |
| 2,569,524 | Hamilton | Oct. 2, 1951 |
| 2,584,126 | Hanford | Feb. 5, 1952 |
| 2,599,640 | Joyce | June 10, 1952 |
| 2,631,998 | Pearson | Mar. 17, 1953 |
| 2,689,241 | Dittman | Sept. 14, 1954 |

FOREIGN PATENTS

| | | |
|---|---|---|
| 590,390 | Great Britain | July 16, 1947 |